United States Patent
Schifrin et al.

(10) Patent No.: US 12,372,164 B2
(45) Date of Patent: *Jul. 29, 2025

(54) VALVE ACTUATOR DEVICE FOR FLUID FLOW CONTROL

(71) Applicant: Batfer Investment S.A., Montevideo (UY)

(72) Inventors: Emiliano Schifrin, Buenos Aires (AR); Adrian Oscar Bucciarelli, Buenos Aires (AR)

(*) Notice: Subject to any disclaimer, the term of this patent is extended or adjusted under 35 U.S.C. 154(b) by 0 days.

This patent is subject to a terminal disclaimer.

(21) Appl. No.: 18/587,020

(22) Filed: Feb. 26, 2024

(65) Prior Publication Data

US 2024/0191812 A1 Jun. 13, 2024

Related U.S. Application Data

(63) Continuation-in-part of application No. 18/149,297, filed on Jan. 3, 2023, now Pat. No. 11,946,566.

(30) Foreign Application Priority Data

Jan. 4, 2022 (AR) .............................. 20220100010

(51) Int. Cl.
*F16K 31/163* (2006.01)
*F16K 31/524* (2006.01)
(Continued)

(52) U.S. Cl.
CPC .... *F16K 31/1635* (2013.01); *F16K 31/52441* (2013.01); *F16K 31/52458* (2013.01); *F16K 35/025* (2013.01); *F16K 37/0083* (2013.01)

(58) Field of Classification Search
CPC .... F16K 31/521; F16K 31/522; F16K 31/523; F16K 31/5282; F16K 31/5284;
(Continued)

(56) References Cited

U.S. PATENT DOCUMENTS

| | | | | |
|---|---|---|---|---|
| 1,156,392 A | * | 10/1915 | Conrader | F16K 31/1635 251/233 |
| 2,954,754 A | * | 10/1960 | Flick | F16K 31/1635 251/63 |

(Continued)

FOREIGN PATENT DOCUMENTS

| JP | 2019215022 | 12/2019 |
|---|---|---|
| WO | 2006070714 | 7/2006 |
| WO | 2020118253 | 11/2020 |

OTHER PUBLICATIONS

"Monitoring of Quarter Turn Actuators," www.turck.de/en/monitoring-of-quarter-turn-actuators-5245.php, accessed Dec. 20, 2021.

*Primary Examiner* — Craig J Price
(74) *Attorney, Agent, or Firm* — Werner IP Law, P.C.

(57) ABSTRACT

The present invention refers to a valve actuator device comprising an upper plate and a lower plate facing each other, defining a housing inside which a cylinder with a stem is housed. The stem is connected to a rotor arm by a guiding element inserted and slidably in line between a lower position and an upper position within guiding grooves arranged in the respective upper plate and lower plate. The rotor arm is configured to rotate about a rotation axle arranged in a rotating element. The valve actuator device may include a position sensor system for detecting an open position and a closed position. The valve actuator device may include a manual override system for manually opening or closing the valve.

5 Claims, 7 Drawing Sheets

(51) Int. Cl.
*F16K 35/02* (2006.01)
*F16K 37/00* (2006.01)

(58) Field of Classification Search
CPC ......... F16K 31/52458; F16K 31/52441; F16K 31/502; F16K 37/0083; F16K 31/14; F16K 31/143; F16K 31/145; F16K 35/025; F16K 17/168; Y10T 74/20504; Y10T 74/18752; Y10T 74/19767; Y10T 74/18984; Y10T 74/18888; Y10T 74/1896; Y10T 74/18936; Y10T 74/18928; Y10T 74/18968; Y10T 74/18944
USPC .................. 251/298–317.1, 228, 279, 58
See application file for complete search history.

(56) References Cited

U.S. PATENT DOCUMENTS

| | | | |
|---|---|---|---|
| 3,523,674 A * | 8/1970 | Olsson | F15B 9/00 91/388 |
| 3,610,568 A * | 10/1971 | Duwe | F16K 31/1635 251/58 |
| 3,672,262 A | 6/1972 | Karr | |
| 3,765,438 A * | 10/1973 | Di Sciascio | F16K 39/02 137/219 |
| 3,806,083 A * | 4/1974 | Phillips | F15B 15/06 91/410 |
| 3,927,573 A | 12/1975 | Sheesley et al. | |
| 4,570,900 A * | 2/1986 | Lonardi | B65D 90/582 74/519 |
| 4,635,901 A | 1/1987 | Pond | |
| 5,429,153 A * | 7/1995 | Squirrell | F15B 15/06 137/385 |
| 6,135,147 A | 10/2000 | Peters et al. | |
| 7,739,978 B2 | 6/2010 | Beckman et al. | |
| 8,608,128 B2 * | 12/2013 | Dolenti | F16K 37/0041 251/129.11 |
| 8,863,596 B2 | 10/2014 | Holtgraver | |
| 9,057,452 B2 * | 6/2015 | Maercovich | F16K 31/404 |
| 9,534,700 B2 | 1/2017 | Denat et al. | |
| 9,587,761 B2 * | 3/2017 | Spohn | F16K 31/105 |
| 9,618,136 B2 | 4/2017 | Bell | |
| 9,927,259 B2 | 3/2018 | Dequarti | |
| 10,364,870 B2 * | 7/2019 | Platzer | F16K 31/055 |
| 10,408,361 B2 * | 9/2019 | Jin | F16K 31/1635 |
| 11,047,499 B2 * | 6/2021 | Davis | F16K 31/05 |
| 11,946,566 B2 * | 4/2024 | Schifrin | F16K 31/52441 |
| 2017/0292628 A1 | 10/2017 | Dolenti | |
| 2018/0172032 A1 | 6/2018 | Modinger et al. | |
| 2021/0123543 A1 | 4/2021 | Inoue et al. | |

* cited by examiner

VALVE ACTUATOR DEVICE FOR FLUID FLOW CONTROL

CROSS-REFERENCE TO RELATED APPLICATION

This application is a continuation-in-part of U.S. application Ser. No. 18/149,297, filed Jan. 3, 2023, which in turn claims priority to Argentine Application No. 20220100010 filed on Jan. 4, 2022, the disclosures of which are incorporated herein by reference for all purposes.

TECHNICAL FIELD OF THE PRESENT INVENTION

The present invention refers to the technical field of valves for fluid flow control, more particularly to valve actuators for fluid flow control in industrial installations or oil or water extraction facilities.

BACKGROUND OF THE INVENTION

The valve actuator device for fluid flow control of the present invention has been designed to achieve a valve actuation for fluid flow control in an easy and safe way; a simple and robust design makes it possible to supply the device components through machining centers without the need for complex machinery, which allows the provision of actuator device components from anywhere in the world.

Due to the simplicity of its design, the maintenance thereof is quick and safe, which can be carried out either in the field or on location without the need to take the equipment to a maintenance center, involving a significant reduction in time and costs related to logistics and qualified staff.

Additionally, special tools or complex machines are not necessary for the maintenance thereof and it allows full disassembly of all its components for repair, calibration or change of any of its components.

One of the main advantages of this actuator is its weight. This allows the manipulation thereof without the need for extra machinery, which allows it to exert an output torque of around 2000 Nm, with an operating pressure of 2500 psi. This guarantees the operators' safety and well-being.

Therefore, the present valve actuator device for fluid flow control presents numerous advantages for the function for which it is intended compared to existing actuators due to the novel design thereof that provides safety, robustness, ease of operation and low-cost maintenance.

SUMMARY OF THE INVENTION

The present invention refers to a ¼-turn actuator, especially configured to be used in plug valves, or rotary valves, such as ball or butterfly valves.

One embodiment of the valve actuator device of the present invention comprises:
  an upper plate and a lower plate facing each other defining a housing inside which a cylinder with a stem is housed, said stem being connected to a rotor arm by means of a guiding element inserted and slidably in line between a lower position and an upper position within guiding grooves arranged in the respective upper and lower plates, wherein said rotor arm is configured to rotate about a rotation axle arranged in a rotating element, said rotating element being formed by two portions: an adapter portion for the connection thereof with the valve stem comprising the rotation axle in which the rotor arm is inserted, and a display portion comprising a visual indicator, and a position sensor system for detecting an open position and a closed position.

Another embodiment of the valve actuator device of the present invention comprises:
  an upper plate and a lower plate facing each other defining a housing inside which a cylinder with a stem is housed, said stem being connected to a rotor arm by means of a guiding element inserted and slidably in line between a lower position and an upper position within guiding grooves arranged in the respective upper and lower plates, wherein said rotor arm is configured to rotate about a rotation axle arranged in a rotating element, said rotating element being formed by two portions: an adapter portion for the connection thereof with the valve stem comprising the rotation axle in which the rotor arm is inserted, and a manual override portion comprising an annular body, a shaft, and a handle for manually causing rotation of the rotation.

The actuator device of the present invention has a simple and robust design and is easy to manufacture and maintain, which allows valves to be operated in any industrial or oil or water extraction facility, with a differential pressure of up to 15,000 psi, generating a maximum torque of 2000 NM with an operating pressure of 2500 psi.

DETAILED DESCRIPTION OF THE INVENTION

Figure 1:
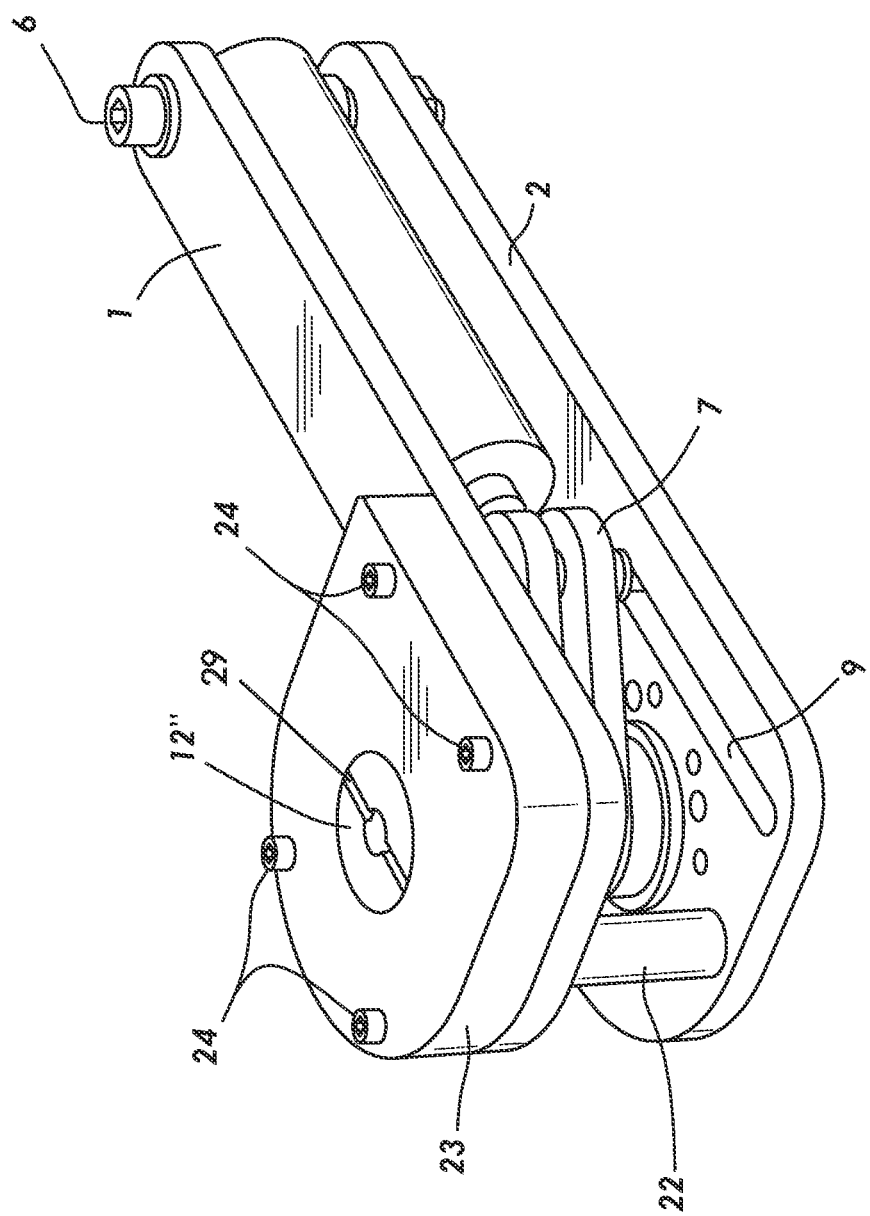
FIG. 1 shows a perspective view of one embodiment of the quarter-turn actuator of the present invention.
Figure 2:
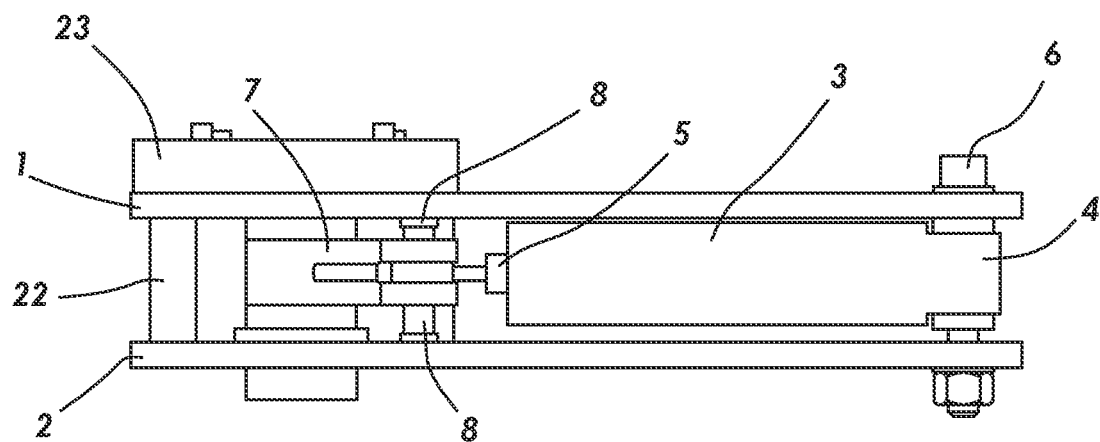
FIG. 2 shows a front elevational view of the quarter-turn actuator of the present invention.

Embodiments of the invention are described more fully hereafter with reference to the accompanying drawings. Elements that are identified using the same or similar reference characters refer to the same or similar elements which perform the same functions across various embodiments. The various embodiments of the invention may, however, be embodied in many different forms and should not be construed as limited to the embodiments set forth herein. Rather, these embodiments are provided so that this disclosure will be thorough and complete, and will fully convey the scope of the invention to those skilled in the art.

The invention will now be described with reference to FIGS. 1 to 5 where a preferred example of the invention is shown. However, the invention is not limited to said example as it includes modifications obvious to any person with ordinary skills in the arts.

The valve actuator device of the present invention comprises an upper plate 1 and a lower plate 2 facing each other that define a support structure within which a hydraulic or pneumatic cylinder 3 with two ends, a fixed end 4 and a mobile end 4' of a stem 5, is housed. The fixed end 4 is attached to the respective upper plate 1 and lower plate 2 by fixing means 6, such as a through bolt.

Figure 3:
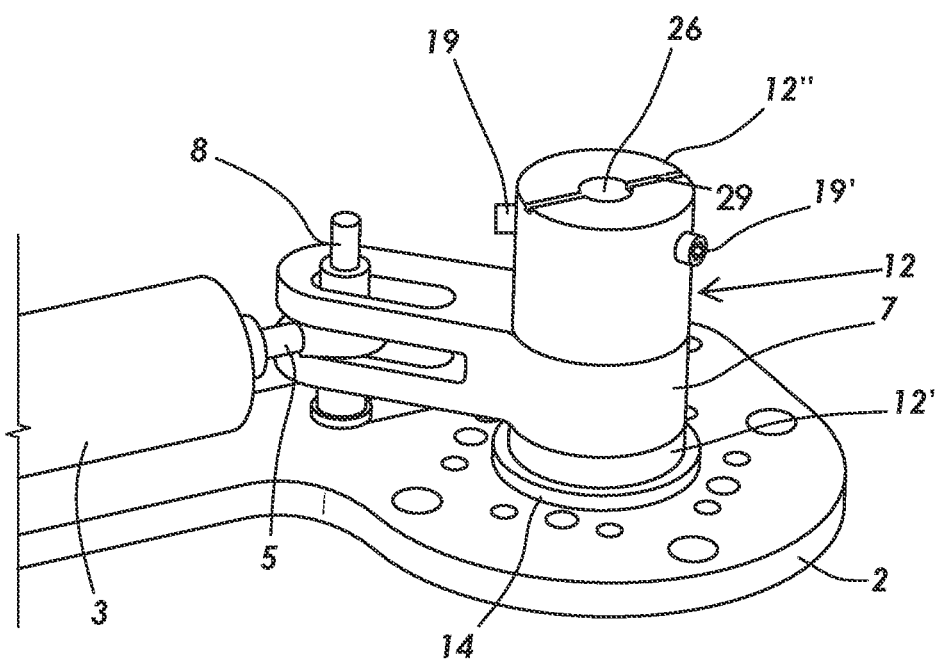
FIG. 3 shows a detailed view of the cylinder, guiding element, rotor arm and rotating element arrangement.
Figure 4:
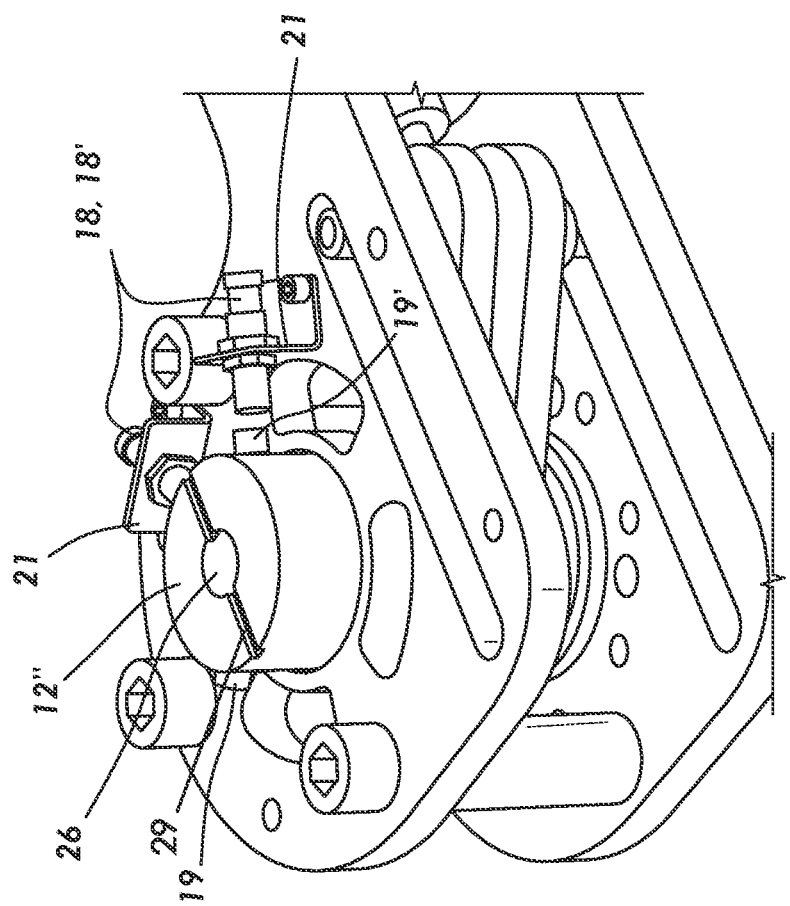
FIG. 4 shows a detailed view of the position sensor system.

The stem 5 of said cylinder 3 is connected to a rotor arm 7 by means of a guiding element 8. Said guiding element 8 has two opposite ends inserted into respective guiding grooves 9, 9' arranged on the respective upper plate 1 and lower plate 2 aligned with the axial axis of the stem 5. Said opposite ends of said guiding element 8 preferably include guiding bushings 17 to facilitate the sliding thereof within the guiding grooves 9, 9'. The guiding grooves 9, 9', together with the guiding bushings 17, support the axial loads that occur when cylinder 3 actuates. (FIG. 3)

The guiding element 8 can move within said grooves 9, 9', between an upper position and a lower position co-linearly with the movement direction of stem 5 when it receives the load from cylinder 3 when it is actuated.

As above mentioned, stem 5 is connected to the rotor arm 7 by means of a guiding element 8 whose respective ends are inserted and displaced within the respective guiding grooves 9, 9' located on opposing upper plate 1 and lower plate 2. This linear movement is translated into a rotational movement of the rotor arm 7 due to the fact that the guiding element 8 is slidably inserted into groove 10 of the rotor arm 7. Thus, when actuating the cylinder 3, the stem 5 moves said guiding element 8 between an upper position and a lower position guided by the respective guiding grooves 9, 9', this linear displacement generating a rotation strength on the rotor arm 7 that rotates about its rotation axle 11 which is part of a rotating element 12 (see FIG. 3).

Figure 5:
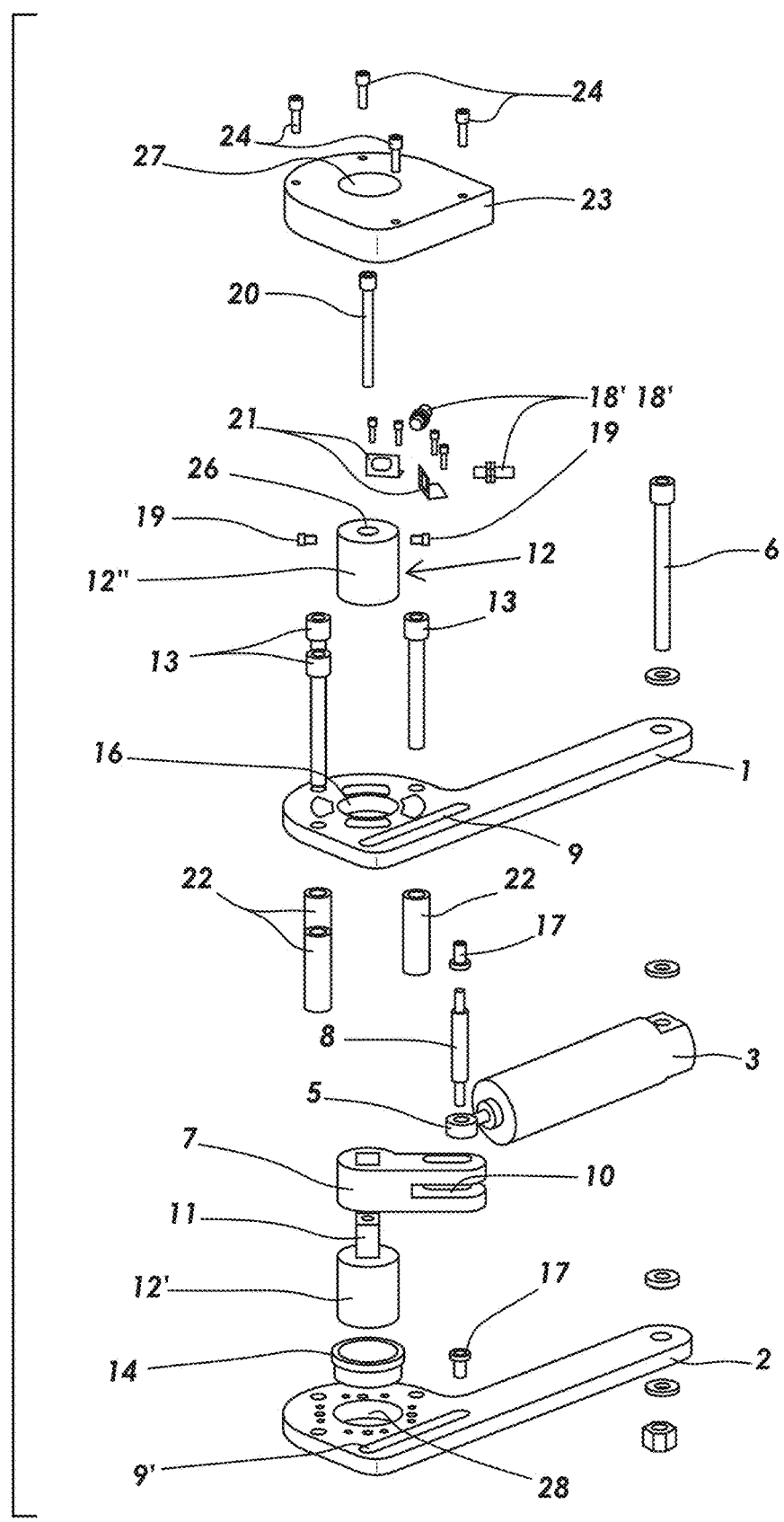
FIG. 5 shows an exploded view of the actuator of the present invention.

In this way, cylinder 3, guiding element 7, rotor arm 7, and part of the rotating element 12 remain enclosed in the housing defined between the upper plate 1 and lower plate 2 as shown in FIG. 1, and they are assembled by means of a plurality of through holes located in the upper plate 1 and lower plate 2 and the respective anchor bolts 13 and spacer elements 22, which provides the assembly structural resistance and robustness (see FIG. 5).

The rotating element 12 is made up of two portions: a first portion or adapter portion 12' for the connection thereof with the stem of valve A that has an end with an opening configured to receive an interchangeable adapter for each type of valve, and an opposite end where a rotation axle 11 is projected for the insertion of rotor arm 7. The first portion or adapter portion 12' is inserted into a through hole 28 of the lower plate 2 by means of a bushing 14, preferably made of bronze, and projects out of the plane of lower plate 2 (FIG. 5).

The second portion or display portion 12" of the rotating element 12 has a main body with a through hole 26, a bearing end, and a slotted end that operates as a visual indicator 29 for the operator to check a first open position and a second closed position of valve A.

Said second portion or display portion 12" is coaxially arranged with the first portion or adapter portion 12' on the bearing end thereof after the rotor arm 7 is inserted into the rotation axle 11 through a through hole in the rotor arm 15. The assembly formed by the first portion or adapter portion 12', the broken arm 7 and the second display portion 12" is put together by means of a fixing means 20 that is inserted into a thread arranged on the rotation axle 11 for this purpose.

The main body of the second display portion 12" is inserted into a through hole of the upper plate 16, and part thereof projects out of the plane of the upper plate 1 defining a volume of the main body of the display portion 12". Interdependent to said volume of the main body of the display portion 12", there is a position sensor system made up of a set of metallic reference elements 19, 19' and respective sensors 18, 18'. The metallic reference elements 19, 19' are arranged on the surface of said volume of the main body of the display portion 12', preferably threaded, and operatively cooperating with respective position sensors 18, 18' arranged on the upper plate 1 for the detection of an open position and a closed position of valve A.

Said position sensors 18, 18' are fixed to the upper plate 1 by support means 21, preferably bracket type, and arranged on a 90° imaginary circumference arc (quarter turn). In this way, each time the actuator reaches a final position, either open or closed, the sensors 18, 18' will detect said positions by means of the metallic position reference elements 19, 19' arranged on the surface of the display portion 12" of the rotating element 12 (see FIG. 4).

The position sensors 18, 18' can be conventional inductive-type position sensors.

The sensor system as well as the body of the display portion 12" of the rotating element 12, are enclosed in a housing defined by a main cover cap 23. The cover cap 23 is fixed to the upper plate 1 by fixing means 24 inserted into respective holes 25 present in the upper plate 1 (see FIG. 1).

Said main cover cap 23 has a through hole 27 that receives the display portion 12" of the rotating element 12 so that both components, the main cover cap 23 and the display portion 12", form a visual indication system for the operator to see an open position or a closed position and even intermediate positions.

As already mentioned, when the rotor arm 7 receives the load from the cylinder 3 through the guiding element 8, it turns the linear movement of said guiding element 8 into a rotational movement of the rotor arm 7 about the rotation axle 11 thereof causing the rotation of the rotating element 12 which describes a 90° movement between an open position and a closed position.

The actuator device of the present invention is designed to be operated with an output torque of 2000 Nm, an operating pressure of 2500 psi in an operating temperature range from −20° C. (−4° F.) to +80° C. (176° F.), and a rotation capacity of 90°±1°.

Figure 6:
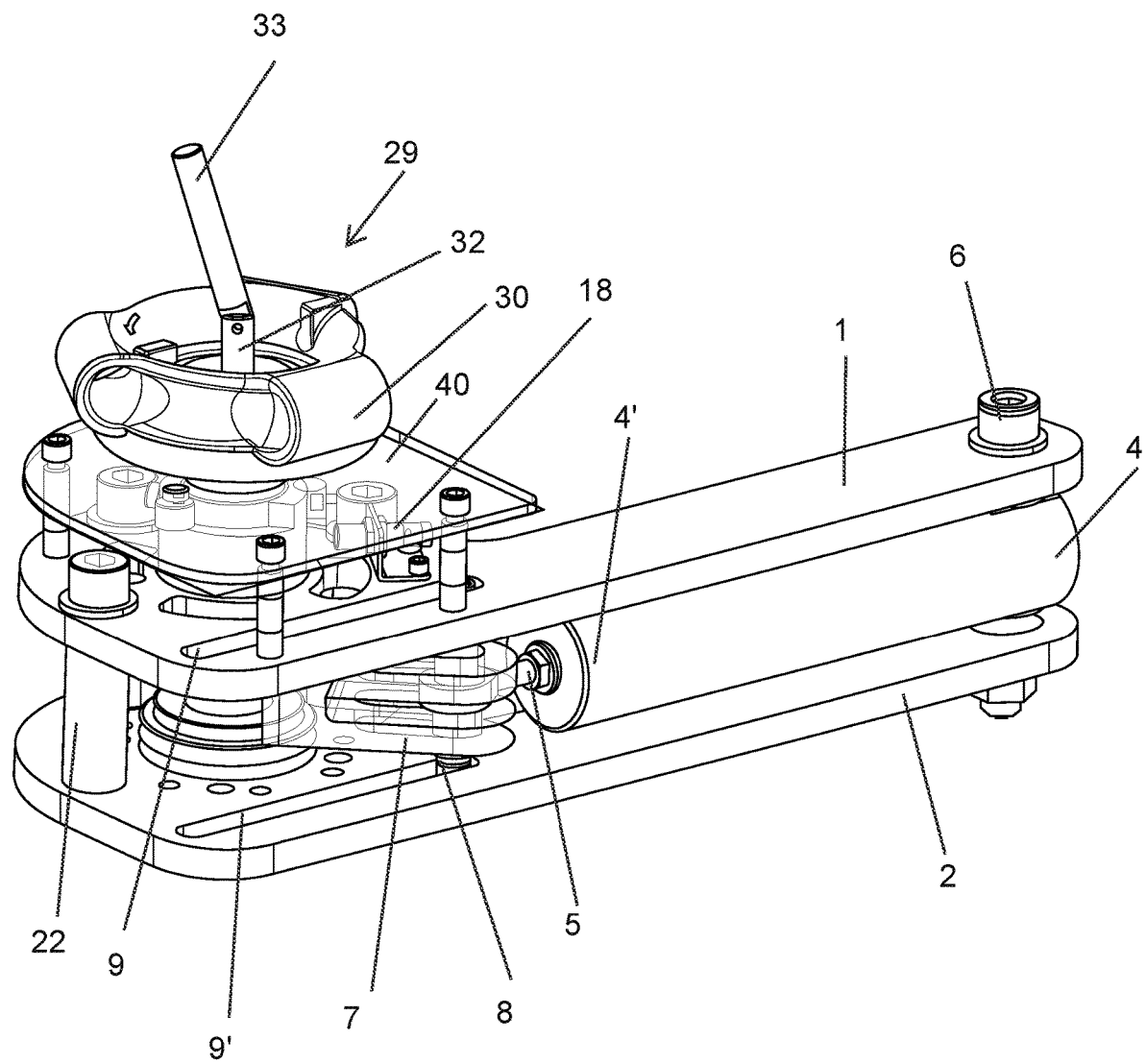
FIG. 6 shows a perspective of another embodiment of the quarter-turn actuator of the present invention.
Figure 7:
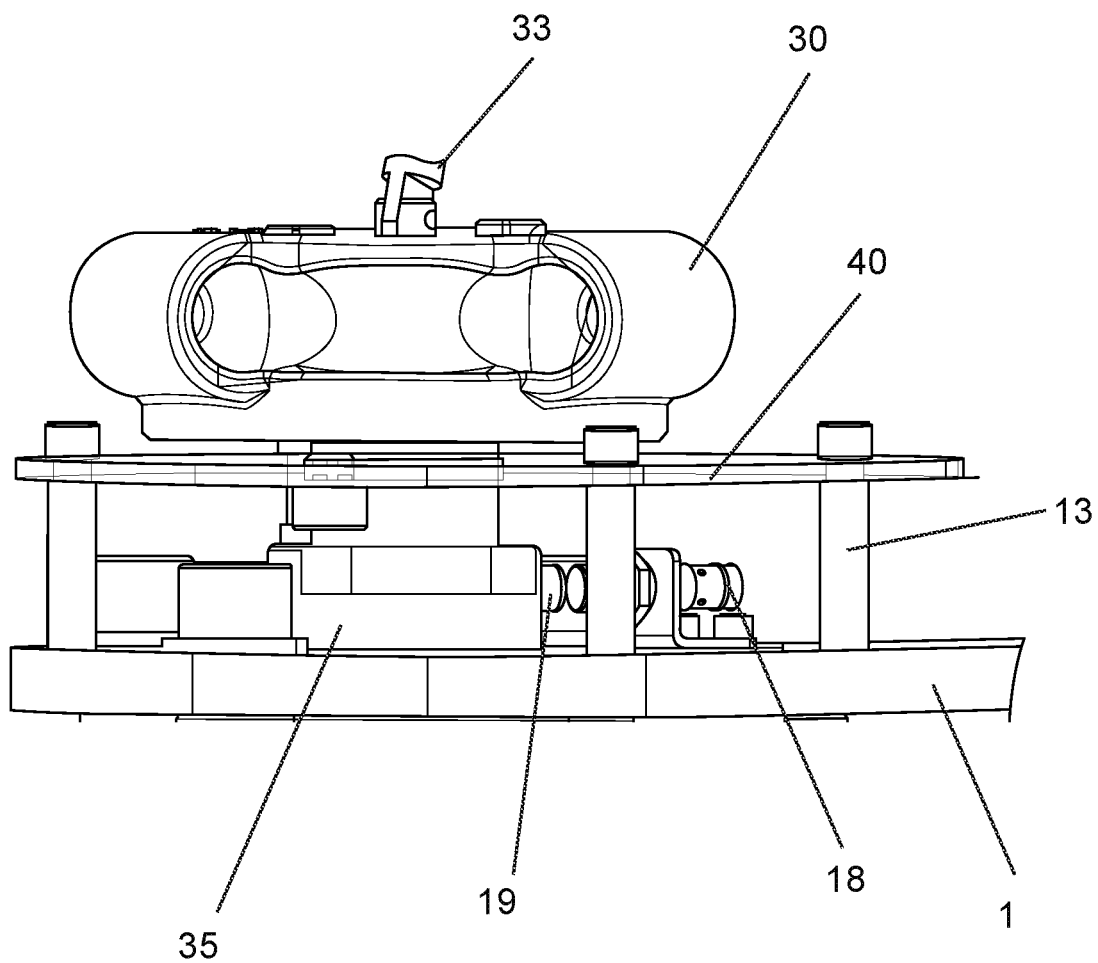
FIG. 7 shows a partial front elevational view of the embodiment of FIG. 6.
Figure 8:
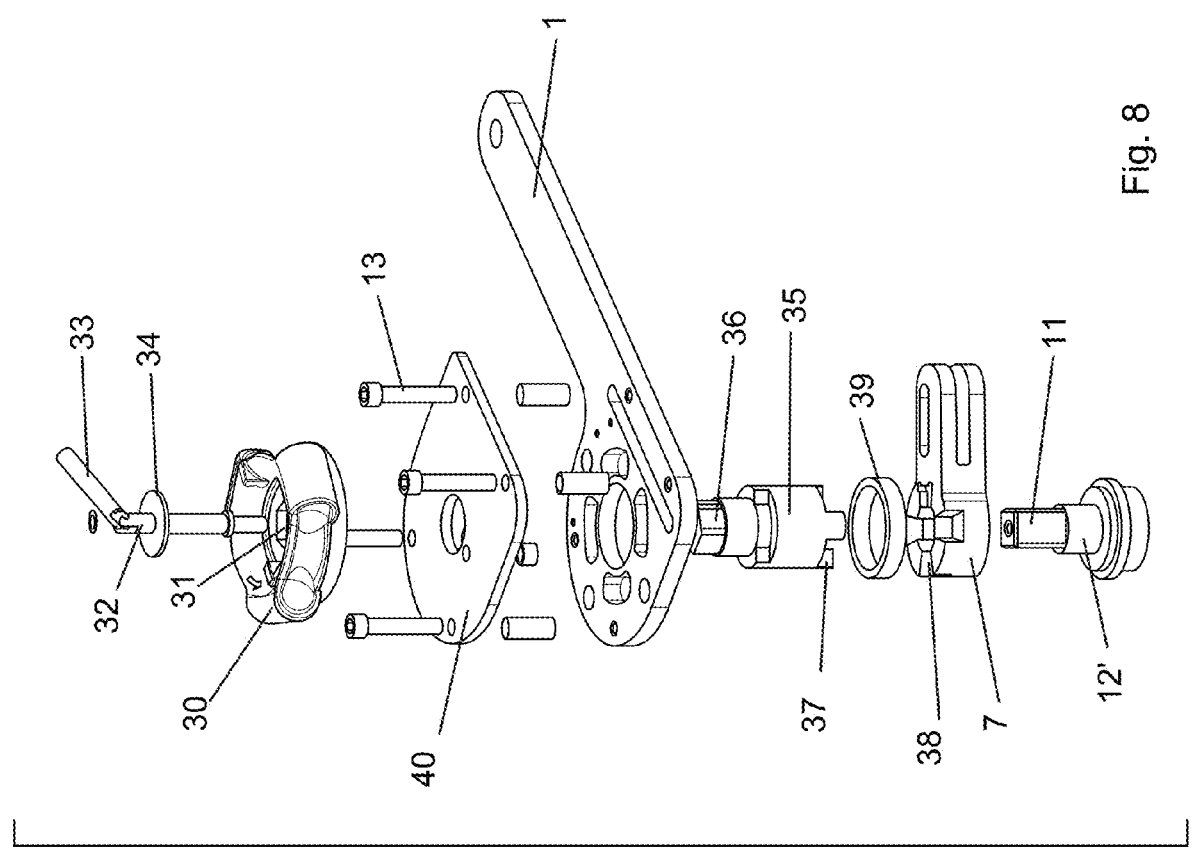
FIG. 8 shows a partial exploded view of the embodiment of FIG. 6.

Turning to FIGS. 6-8, there is shown another embodiment of the present invention. This embodiment is similar to that of FIGS. 1-5, but instead of a visual position display, it includes a manual override system 29. As seen in FIG. 6, the actuator includes upper plate 1, lower plate 2, cylinder 3, and cylinder stem 5. The actuator drives rotor arm 7 and maintains alignment using guiding element 8 moving along guiding grooves 9, 9'. The operation of the actuator is the same as that described with respect to FIGS. 1-5. The actuator may also include the position reference elements 19, 19' and position sensors 18, 18'. However, instead of a visual display portion, the actuator includes a manual override system 29.

Manual override system 29 comprises annular body 30 which has a faceted opening 31. Mounted in annular body 30 is a shaft 32. Shaft 32 may be mounted in place by welding or other wise affixing mounting plate 34 into annular body 30. Attached to shaft 32 is handle 33. Faceted opening 31 is configured to receive an upper faceted end 36 of rotating element 35. It will be appreciated that the exact number of facets can vary. Faceted end 36 and rotating element 35 may include a blind bore (not shown) for receiving shaft 32. It will be appreciated though that the features are not shown to scale and the length of shaft 32 may vary. As best seen in FIG. 8, rotating element 35 has lower projections 37 which are shaped to fit in notches 38 of rotor arm 7. The exact configuration of projections 37/notches 38 may vary. If desired, a bushing 39 may surround rotating element 35. Annular body 30 rests on cover plate 40, which is attached to the actuator system using anchor bolts 13 or other means well known to those skilled in the art. It will be appreciated that FIG. 8 does not include every feature, bolt, or component of the actuator, but is focused on the manual override components.

To manually override the actuator and thus open or close the valve, a user may grasp handle 33 and rotate it in the necessary direction to open or close the valve. Rotation of the handle rotates annular body 30 which in turn rotates rotating element 35, rotor arm 7, and rotation axle 11 which is operatively connected to a valve.

If desired, position sensing elements 19, 19' may be affixed to rotating element 35, and position sensors 18, 18' may be mounted atop plate 1, as in the embodiment of FIGS. 1-5. Thus, the position of the valve may be detected and signals indicating the same sent to the user.

The open nature of the actuator designs of the present invention allow for a quick disconnect of the hydraulic/pneumatic lines and for the performance of a manual override. Many prior art actuators are fully enclosed and such manual override capability is not possible.

REFERENCE NUMBERS

Upper plate 1
Lower plate 2
Cylinder 3
Cylinder fixed end 4
Cylinder free end 4'
Cylinder stem 5
Cylinder fixing means 6
Rotor arm 7
Guiding element 8
Guiding grooves 9, 9'
Rotor groove 10
Rotation axle 11
Rotating element 12
Anchor bolts 13
Lower plate bushing 14
Rotor arm through hole 15
Upper plate through hole 16
Guiding bushings 17
Position sensors 18, 18'
Position reference elements 19, 19'
Bolt 20
Sensor support means 21
Spacer elements 22
Main cover cap 23
Cover plate fixing elements 24
Upper plate holes 25
Display portion through hole 26
Cover cap through hole 27
Lower plate through hole 28
Manual override 29
Annular body 30
Faceted opening 31
Shaft 32
Handle 33
Mounting plate 34
Rotating element 35
Faceted end 36
Projections 37
Notches 38
Bushing 39
Cover plate 40

The invention claimed is:

1. A valve actuator device, comprising:
an upper plate (1) and a lower plate (2) facing each other, defining a housing inside which a cylinder (3) with a stem (5) is housed,
said stem (5) being connected to a rotor arm (7) by means of a guiding element inserted and slidably in line between a lower position and an upper position within guiding grooves (9, 9') arranged in the respective upper plate (1) and lower plate (2),
said rotor arm (7) is configured to rotate about a rotation axle (11) arranged in a rotating element (12') adapted to be connected to a valve stem;
an upper rotating element (35) configured to rotate with said rotor arm (7), said upper rotating element (35) being operatively connected to a manual override system (29), wherein said manual override system (29) comprises an annular body (30), a shaft (32) affixed to said annular body (30) and a handle (33) extending from said shaft (32), whereby turning of said handle (33) rotates said annular body and in turn rotates said upper rotating element (35), said rotor arm (7), and said rotation axle (11).

2. The valve actuator device according to claim 1, characterized in that said cylinder (3) has a fixing end (4) attached to the respective upper plate (1) and lower plate (2) by fixing means (6).

3. The valve actuator device according to claim 1, characterized in that said guiding element (8) includes guiding bushings (17).

4. The valve actuator device according to claim 1, characterized in that said guiding grooves (9, 9') are aligned with the axial axis of the stem (5).

5. The valve actuator device according to claim 1, characterized in that the housing defined between the upper plate (1) and lower plate (2) is assembled by means of a plurality of through holes in the upper plate (1) and lower plate (2) and respective anchor bolts (13) and spacer elements (22).

* * * * *